(12) United States Patent
Yoshida et al.

(10) Patent No.: US 10,930,242 B2
(45) Date of Patent: Feb. 23, 2021

(54) DISPLAY APPARATUS, OPERATION ASSIST SYSTEM AND OPERATION ASSIST METHOD

(71) Applicant: AIOI SYSTEMS CO., LTD., Tokyo (JP)

(72) Inventors: Shoichi Yoshida, Tokyo (JP); Yasuto Takagi, Tokyo (JP); Hirotada Chikakui, Tokyo (JP)

(73) Assignee: AIOI SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 16/708,697

(22) Filed: Dec. 10, 2019

(65) Prior Publication Data

US 2020/0273425 A1    Aug. 27, 2020

(30) Foreign Application Priority Data

Feb. 25, 2019    (JP) .............................. JP2019-031289

(51) Int. Cl.
*G08B 13/14*    (2006.01)
*G09G 5/00*    (2006.01)
(Continued)

(52) U.S. Cl.
CPC ........... *G09G 5/006* (2013.01); *G06F 3/1446* (2013.01); *G09G 5/12* (2013.01); *H04B 5/0031* (2013.01);
(Continued)

(58) Field of Classification Search
CPC ...... G09G 5/006; G09G 5/12; G09G 2370/02; G09G 2370/16; H04W 4/80; G06F 3/1446; H04B 5/0031; H04M 1/7253
See application file for complete search history.

(56) References Cited

U.S. PATENT DOCUMENTS 5,697,061 A * 12/1997 Krueger ............... G06K 7/0008
455/39
5,729,696 A * 3/1998 Goodwin, III ....... G06Q 20/203
705/22
(Continued)

FOREIGN PATENT DOCUMENTS

EP    1 330 075    7/2003
EP    2 963 609    1/2016
(Continued)

OTHER PUBLICATIONS

Extended European Search Report dated Jul. 16, 2020 in corresponding European Patent Application No. 20154669.4.

*Primary Examiner* — Munear T Akki
(74) *Attorney, Agent, or Firm* — Wenderoth, Lind & Ponack, L.L.P.

(57) ABSTRACT

A display apparatus is provided with an interface, a storage device, an antenna and a processing device. The interface connects to a given network. The storage device stores data to be used to perform a communication with an external host controller via the network. The antenna performs a near field communication with an external terminal. The processing device transmits the data to the terminal in response to a request from the terminal and stores other data received from the terminal in response to another request from the terminal in the storage device.

2 Claims, 4 Drawing Sheets

(51) Int. Cl.
*H04W 4/80* (2018.01)
*G06F 3/14* (2006.01)
*G09G 5/12* (2006.01)
*H04B 5/00* (2006.01)
*H04M 1/725* (2021.01)

(52) U.S. Cl.
CPC ........... *H04M 1/7253* (2013.01); *H04W 4/80* (2018.02); *G09G 2370/02* (2013.01); *G09G 2370/16* (2013.01)

(56) References Cited

U.S. PATENT DOCUMENTS

| | | | | |
|---|---|---|---|---|
| 2002/0002421 | A1* | 1/2002 | Murofushi | G06F 3/147 700/214 |
| 2007/0181678 | A1* | 8/2007 | Nilsson | G06F 3/147 235/383 |
| 2008/0100444 | A1* | 5/2008 | Sato | G06Q 10/08 340/572.1 |
| 2008/0177665 | A1* | 7/2008 | Noordam | H04L 9/3236 705/50 |
| 2010/0253472 | A1* | 10/2010 | Hashiguchi | G06Q 30/06 340/5.91 |
| 2012/0126982 | A1* | 5/2012 | Lee | G06Q 30/06 340/572.1 |
| 2015/0034719 | A1* | 2/2015 | Wei | G06F 3/14 235/383 |
| 2016/0004891 | A1* | 1/2016 | Moon | G06K 7/10198 340/10.51 |
| 2017/0279481 | A1* | 9/2017 | Rossl | G08C 19/00 |
| 2018/0357451 | A1* | 12/2018 | Tingler | G09F 3/00 |
| 2019/0012937 | A1* | 1/2019 | Sundholm | G06K 19/077 |

FOREIGN PATENT DOCUMENTS

| | | |
|---|---|---|
| JP | 2003-182821 | 7/2003 |
| JP | 2008-112347 | 5/2008 |
| JP | 2011-233088 | 11/2011 |
| JP | 2013-224186 | 10/2013 |
| JP | 2015-168481 | 9/2015 |
| JP | 6180121 | 8/2017 |
| WO | 2014/168645 | 10/2014 |

\* cited by examiner

DISPLAY APPARATUS, OPERATION ASSIST SYSTEM AND OPERATION ASSIST METHOD

TECHNICAL FIELD

The present invention relates to a display apparatus, an operation assist system using this display apparatus and an operation assist method using this operation assist system.

BACKGROUND ART

As an example of an operation assist system using a display apparatus, there is a picking assist system. In picking operations, various items are stored in reservoirs such as shelves and an operator selectively takes out arbitrary items which are operation targets, among those items. At that time, items which are operation targets may be visually shown by use of display apparatus, so that the operator does not mistake. For example, items to be taken out may be indicated to operator by displaying, under remote controls of display apparatus, that are arranged in association with each item, by a host controller connected to a same network as those display apparatuses. Systems to assist such picking operations are broadly used, for example, in production lines, logistics bases, or the like.

In such operation assist systems, a same number or more of display apparatuses as a number of types of items prepared as picking targets operate simultaneously in a state of being connected to a same network. Identification information is given to each display apparatus. A host controller may use this identification information to selectively transmit an instruction to a specific display apparatus. In addition, each display apparatus may include its own identification information in information to transmit to the host controller, to indicate a transmission source of this information to the host controller. It should be noted that there is a case in which this identification information is also associated in effect to a type of an item associated to the display apparatus.

Identification information of a display apparatus may be changeably set as a state of dip switches provided to the display apparatus, for example. Also, identification information of a display apparatus may be changeably stored in a storage device incorporated to the display apparatus. In addition, identification information of a display apparatus may be described on a sticker or the like attached to a surface of the display apparatus.

Failures, damages or the like may occur to a display apparatus; in such cases, exchange to another display apparatus will be performed. When exchanging display apparatuses, it is favorable that the exchange destination display apparatus inherits identification information same as the exchange source display apparatus. However, operation of inheriting identification information between display apparatuses may be complicated and difficult.

For example, when identification information is set to dip switches, it is necessary to correctly know a state of dip switches of the exchange source display apparatus and correctly set a state of dip switches of the exchange destination display apparatus. In addition, when identification information is stored in a storage device, identification information is not necessarily electrically readable from the exchange source display apparatus thereof which is failed or damaged. Furthermore, when identification information is described on a sticker or the like, it may be considered cases in which identification information is hardly readable or not readable due to soiling or damage of the sticker.

In relation with the above, patent literature 1 (Japanese Patent No. 6180121) discloses an invention of a display apparatus. This display apparatus is able to display information transmitted from an external display controller wirelessly or by wire and applicable to an operation assist system or the like for example. This display apparatus is configured so that a plurality of display apparatuses is attachable to a horizontal frame on the front of a rack that a picking shelf has. The horizontal frame supports a plurality of display apparatus while also performing electrical connection with the plurality of display apparatuses. A plurality of display apparatuses may be attached to a same horizontal frame while an arbitrary display apparatus also can be individually attached or detached.

CITATION LIST

Patent Literature

[Patent Literature 1] Japanese Patent No. 6180121

SUMMARY OF INVENTION

Problem to be Solved by the Invention

Providing a display apparatus and a terminal able to easily perform inheritance of identification information, an operation assist system using the display apparatus and the terminal, and an operation assist method using the operation assist system. Other problems and new features will be clarified by disclosures and attached drawings of the present description.

Means for Solving the Problem

In the following, means to solve the problem will be described by use of numbers used in "Description of Embodiments". Those numbers are added in order to clarify correspondence relationship between descriptions in "Claims" and "Description of Embodiments". Therefore, those numbers are not intended to be used for limitation of interpretation of technical scope of the invention described in "Claims"

A display apparatus (30) according to an embodiment is provided with an interface (32), a storage device (394), an antenna (37) and a processing device (393). The interface (32) connects to a given network (20). The storage device (394) stores data to be used to perform a communication with an external host controller (10) via the network (20). The antenna (37) performs a near field communication with an external terminal (40). The processing device (393) transmits the data to the terminal (40) in response to a request from the terminal (40) and stores other data received from the terminal (40) in response to another request from the terminal (40) in the storage device (394).

Effects of the Invention

According to the embodiment, an inheritance of identification information between display apparatuses can be easily performed.

DESCRIPTION OF EMBODIMENTS

Embodiments for carrying out an operation assist system, a display apparatus, a terminal and an operation assist method according to the present invention will be described below with reference to attached drawings.

First Embodiment

Figure 1:
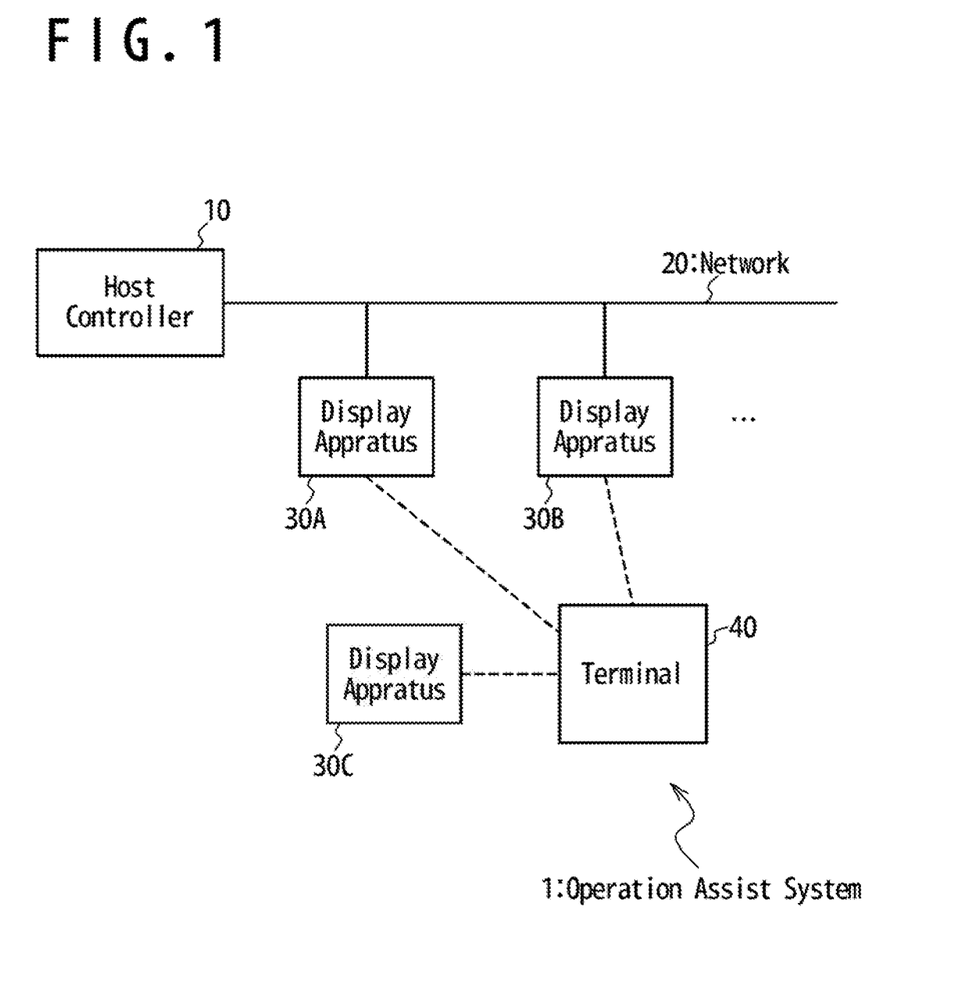
FIG. 1 is a block circuit diagram showing an example of configuration of an operation assist system according to an embodiment.

An example of configuration of an operation assist system 1 according to an embodiment will be described with reference to FIG. 1. FIG. 1 is a block circuit diagram showing an example of configuration of an operation assist system 1 according to an embodiment.

The operation assist system 1 in FIG. 1 is provided with a host controller 10, a network 20, display apparatuses 30A, 30B and 30C and a terminal 40. In an example of FIG. 1, a total number of the display apparatuses 30A, 30B and 30C is three, while this is merely an example and does not limit the present embodiment. In the following, when the display apparatuses 30A, 30B and 30C are not distinguished, they will be simply noted display apparatus(es) 30.

The host controller 10 is connected to the network 20. The display apparatuses 30 are configured to be able to be connected to and/or disconnected from the network 20. In the example of FIG. 1, among the display apparatuses 30, the display apparatuses 30A and 30B, which are a part, are connected to the network 20, while the remaining display apparatus 30C is not connected to the network 20. The terminal 40 is able to communicate by Near Field Communication (NFC) with the display apparatuses 30 and is an arbitrary information terminal able to execute predetermined programs, and may be a smartphone terminal, a tablet terminal or the like. It should be noted that, generally, any one among the display apparatuses 30 can simultaneously communicate by NFC with one terminal 40.

Figure 2:
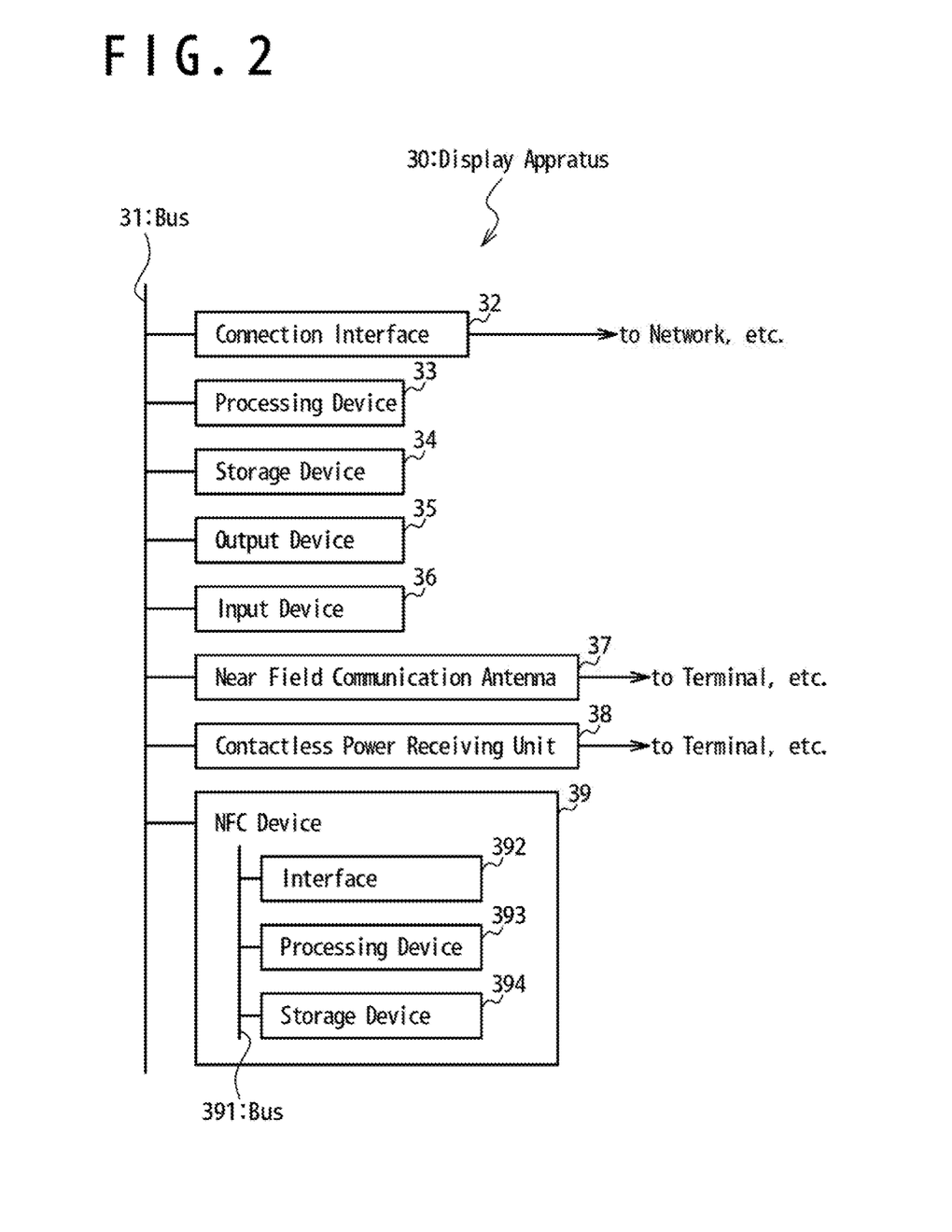
FIG. 2 is a block circuit diagram showing an example of configuration of a display apparatus according to an embodiment.

An example of configuration of a display apparatus 30 according to an embodiment will be described with reference to FIG. 2. FIG. 2 is a block circuit diagram showing an example of configuration of a display apparatus 30 according to an embodiment.

The display apparatus 30 in FIG. 2 is provided with a bus 31, a connection interface 32, a processing device 33, a storage device 34, an output device 35, an input device 36, a Near Field Communication antenna 37, a contactless power receiving unit 38 and a NFC device 39. The NFC device 39 is provided with a bus 391, an interface 392, a processing device 393 and a storage device 394.

The bus 31 is connected to the connection interface 32, the processing device 33, the storage device 34, the output device 35, the input device 36, the Near Field Communication antenna 37, the contactless power receiving unit 38 and the NFC device 39. In other words, the connection interface 32, the processing device 33, the storage device 34, the output device 35, the input device 36, the Near Field Communication antenna 37, the contactless power receiving unit 38 and the NFC device 39 are connected so that they can communicate with each other via the bus 31. The connection interface 32 is configured to be connectable to the external network 20 or the like. The Near Field Communication antenna 37 and the contactless power receiving unit 38 are configured to be connectable to the external terminal 40.

The bus 391 is connected to the interface 392, the processing device 393 and the storage device 394. In other words, the interface 392, the processing device 393 and the storage device 394 are connected so that they can communicate with each other via the bus 391.

Figure 3:
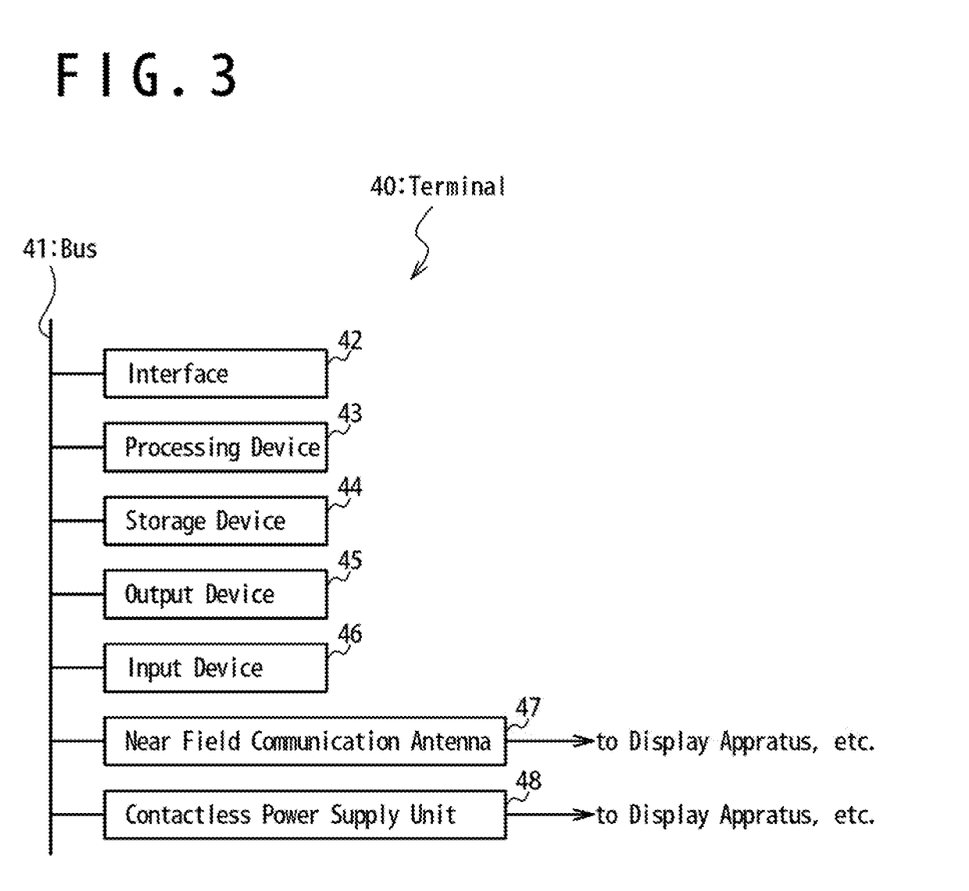
FIG. 3 is a block circuit diagram showing an example of configuration of a terminal according to an embodiment.

An example of configuration of a terminal 40 according to an embodiment will be described with reference to FIG. 3. FIG. 3 is a block circuit diagram showing an example of configuration of a terminal 40 according to an embodiment.

The terminal 40 in FIG. 3 is provided with a bus 41, an interface 42, a processing device 43, a storage device 44, an output device 45, an input device 46, a Near Field Communication antenna 47 and a contactless power supply unit 48.

The bus 41 is connected to the interface 42, the processing device 43, the storage device 44, the output device 45, the input device 46, the Near Field Communication antenna 47 and the contactless power supply unit 48. In other words, the interface 42, the processing device 43, the storage device 44, the output device 45, the input device 46, the Near Field Communication antenna 47 and the contactless power supply unit 48 are connected so that they can communicate to each other via the bus 41. The Near Field Communication antenna 47 and the contactless power supply unit 48 are configured to be connectable to the external display apparatuses 30 or the like.

Operations of each component shown in FIGS. 1, 2 and 3 will be described. The host controller 10 in FIG. 1 generates a signal showing an instruction directed to the display apparatuses 30 and transmits this signal via the network 20. The host controller 10 may operate under a control of another computer or the like that is not shown. At that time, a content of the instruction shown by the signal may be directed to a specific display apparatus 30. And, the signal transmitted to the specific display apparatus 30 may be received by every display apparatuses 30 connected to the network 20. Each display apparatus 30 determines whether the content of the instruction shown by the received signal is directed to itself, follows to the instruction directed to itself and may ignore the instruction directed to a display apparatus 30 other than itself.

Each display apparatus 30 is given with identification information to be distinguished from other display apparatus 30. This identification information may be stored in the storage device 394 in the NFC device 39 provided to the display apparatus 30, for example. The instruction shown by the signal transmitted by the host controller 10 includes identification information given to the display apparatus 30 which is a target. When the identification information included in the received signal matches with the identification information of itself, the display apparatus 30 follows the instruction shown by the signal and may ignore the instruction in other cases.

The network 20 in FIG. 1 mediates communications performed between the host controller 10 and the display apparatuses 30. The network 20 may be furthermore configured to physically support the display apparatuses 30. The network 20 may be provided with, for example, two communication lines to realize wired communications. In this case, the plurality of display apparatuses 30 may be electrically connected in parallel to the two communication lines provided to the network 20. Furthermore, the network 20 may supply the electrically connected display apparatus 30 with electric power for the display apparatus 30 to operate.

As another example, the network 20 may be provided with an antenna to realize a wireless communication. In this case, the display apparatus 30 may be supplied with electric power to operate by a power source that is not shown.

The display apparatuses 30 in FIG. 1 are electrically connected to the network 20 via the connection interface(s) 32 in FIG. 2. The connection interface(s) 32 may be configured to be physically connectable to the network 20.

The display apparatus 30 may, for example, be configured as a computer which performs a predetermined operation by execution of an arbitrary program stored in the storage device 34 in FIG. 2 by the processing device 33 in FIG. 2. The processing device 33 may compare the identification information included in the signal received from the host controller 10 via the network 20 with the identification information stored in the storage device 394 to determine whether to follow the instruction shown in the signal or not. The content of this instruction may, for example, be an operation of visually outputting predetermined information by use of the output device 35.

The output device 35 in FIG. 2 is configured to output any visual information to an operator, and may be provided with a display device which displays a numerical value and a light which emits light, for example. The display apparatus 30 follows the instruction received from the host controller 10, makes the light as the output device 35 to emit light and displays an instructed numerical value on the display device. By doing so, the operator can pay attention to the display apparatus 30 of which a light emits light among the plurality of display apparatuses 30. In addition, the operator can perform an operation of taking out just a number, corresponding to the numerical value displayed on the display device of the display apparatus 30, of the item associated to the display apparatus 30.

The input device 36 in FIG. 2 may be provided with a push-button switch for example. The operator operates the input device 36 to show that the operation of taking out items is completed. When the input device 36 is operated, the display apparatus 30 terminates the output of visual information by the output device 35, turn the light off for example, initializes the display on the display device for example, and transmits a signal that shows that the instruction is completed to the host controller 10.

As a result of the above described series of operations, the operation assist system 1 according to the present embodiment can instruct a predetermined operation to an operator via the display apparatus 30 and can receive a result of the operation via the display apparatus 30.

Next, an operation of exchanging display apparatuses 30 will be described with reference to FIG. 4. Here, as an example, it will be described a case in which the display apparatus 30B connected to the network 20 is failed or damaged and consequently it is exchanged to the other display apparatus 30C. In such case, all or a part of data stored in the display apparatus 30B as the exchange source is read out by the terminal 40 and the data that is read out is set to the display apparatus 30C as the exchange destination, so that the display apparatus 30C becomes able to operate as the display apparatus 30B. In other words, data of the display apparatus 30B as the exchange source is inherited via the terminal 40 to the display apparatus 30C as the exchange destination. Data to be inherited includes at least the identification information for the host controller 10 to identify the display apparatuses 30.

Figure 4:
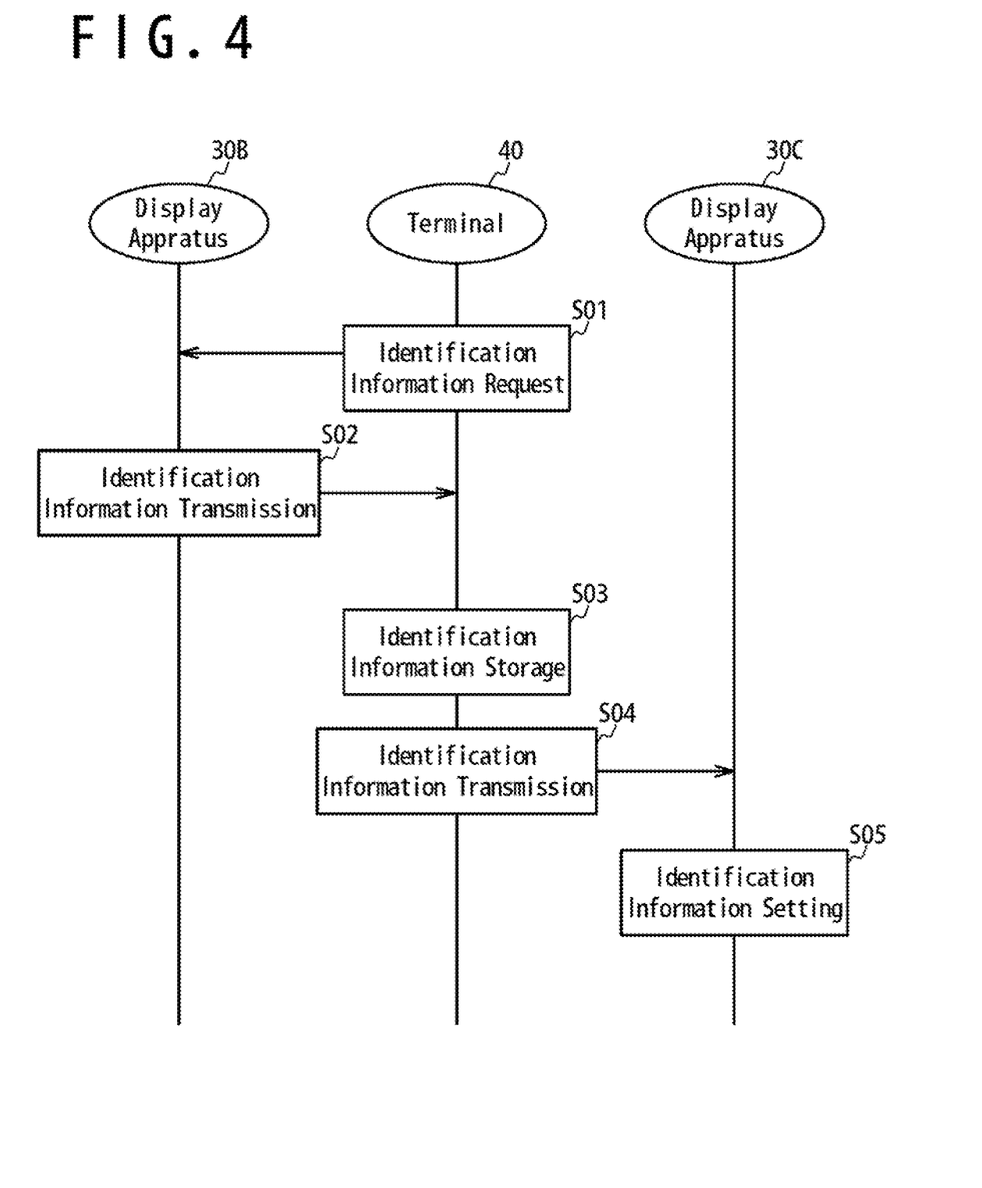
FIG. 4 is a sequence diagram showing an example of configuration of an operation assist method according to an embodiment.

FIG. 4 is a sequence diagram showing an example of configuration of an operation assist method according to an embodiment. The sequence diagram in FIG. 4 shows a first step S01 to a fifth step S05 included in a Near Field Communication performed between the display apparatus 30B, the terminal 40 and the display apparatus 30C.

Among each of steps in FIG. 4, the first step S01 to the third step S03 show a first operation performed between the terminal 40 and the display apparatus 30B. In the first operation, the terminal 40 reads out all or a part of data stored in the display apparatus 30B as the exchange source.

The remaining fourth step S04 and fifth step S05 show a second operation performed between the terminal 40 and the other display apparatus 30C. In the second operation, the data that is read out is stored in the display apparatus 30C as the exchange destination.

When the first operation starts, the first step S01 is executed. In the first step S01, the terminal 40 requests identification information to the display apparatus 30B. In particular, at first, the terminal 40 is set to a first operation state by an operation by an operator or the like, and starts Near Field Communication with the display apparatus 30B. The first operation state is, in other words, an operation mode in which the terminal 40 reads out data from a display apparatus 30. At that time, a contactless power supply is performed from the contactless power supply unit 48 of the terminal 40 to the contactless power receiving unit 38 of the display apparatus 30B, and at least the NFC device 39 of the display apparatus 30B starts operating by the contactless power supply. Here, the contactless power supply unit 48 of the terminal 40 may be incorporated with the Near Field Communication antenna 47 of the terminal 40. In addition, the contactless power receiving unit 38 of the display apparatus 30 may be incorporated with the Near Field Communication antenna 37 of the display apparatus 30. It should be noted that the NFC device 39 of the display apparatus 30B may be supplied with an electrical power from the network 20 via the connection interface 32. Next, when the terminal 40 and the display apparatus 30B are connected by Near Field Communication, the terminal 40 requests transmission of identification information or data including the identification information to the display apparatus 30B. A signal that shows this request is received by the display apparatus 30B via Near Field Communication. The step S02 is executed next to the first step S01.

In the second step S02, the display apparatus 30B transmits the identification information to the terminal 40. In particular, at first, the processing device 393 of the NFC device 39 of the display apparatus 30B reads out data including the identification information from the storage device 394, in response to the request from the terminal 40. Next, the processing device 393 transmits the data that is read out to the terminal 40 by Near Field Communication. Next, the processing device 43 of the terminal 40 receives the transmitted data by Near Field Communication. The third step S03 is executed next to the second step S02.

In the third step S03, the terminal 40 stores the received data including the identification information to the storage device 44. When the third step S03 is completed, the first operation is completed too.

At that time, the contactless power supply from the terminal 40 to the display apparatus 30B may be terminated too. This contactless power supply may be terminated automatically by pulling apart the terminal 40 from the display apparatus 30B by an operator.

In addition, the terminal 40 moves from the first operation state to the second operation state. This move may be performed automatically or in response to an operation of an operator on the input device 46. In other words, the first operation state of the terminal 40 is a state in which the storage device 44 of the terminal 40 is ready to store data including the identification information of the display apparatus 30. In addition, the second operation state of the terminal 40 is a state in which the data including the identification information of the display apparatus 30 is stored in the storage device 44 of the terminal 40 and this data is ready to be transmitted to another display apparatus 30. In other words, the second operation state is an operation mode in which the terminal 40 writes the data to the display apparatus 30.

It is favorable that the terminal 40 performs visual displaying by use of the output device 45 so that an operator can distinguish the first operation state and the second operation state. For example, the output device 45 may be provided with a light and the processing device 43 may perform controls such as turning this light off in the first operation state and on in the second operation state. In addition, the output device 45 may be provided with a display device able to display all or a part of content of identification information and/or data stored in the storage device 44.

When the second operation starts, the fourth step S04 is executed. In the fourth step S04, the terminal 40 transmits the identification information of the display apparatus 30B as the exchange source to the display apparatus 30C as the exchange destination. In particular, firstly, the terminal 40 in the second operation state starts Near Field Communication with the display apparatus 30C. At that time, a contactless power supply is performed from the contactless power supply unit 48 of the terminal 40 to the contactless power receiving unit 38 of the display apparatus 30C and at least the NFC device 39 of the display apparatus 30C starts operating by the contactless power supply. It should be noted that the NFC device 39 of the display apparatus 30C may be supplied with an electrical power from the network 20 via the connection interface 32. Next, when the terminal 40 and the display apparatus 30C are connected by Near Field Communication, the processing device 43 of the terminal 40 reads out the data including the identification information of the display apparatus 30B stored in the storage device 44 and transmits this data to the display apparatus 30C via Near Field Communication. Next, the display apparatus 30C receives this data by Near Field Communication. The step S05 is executed next to the fourth step S04.

In the fifth step S05, the identification information of the display apparatus 30B as the exchange source is set to the display apparatus 30C as the exchange destination. In particular, the processing device 33 of the display apparatus 30C stores the received data to the storage device 34.

Here, the processing device 33 sets the identification information included in the received data as the identification information for the host controller 10 to identify the display apparatus 30C. Thereafter, by being connected to the network 20, the display apparatus 30C can operate as the display apparatus 30B. At that time, it is favorable that the display apparatus 30B is not connect to the network 20 anymore or connected while the identification information is deleted. That is, to avoid the host controller 10 from confusing when the display apparatus 30C as the exchange destination, to which the identification information of the display apparatus 30B as the exchange source is set, is connected to the network 20, it is favorable not to connect a plurality of display apparatuses 30 to which a same identification information is set to the network 20 at the same time.

It should be noted that the display apparatus 30C may transmit a signal indicating that the identification information of the display apparatus 30B as the exchange source is set to the display apparatus 30C as the exchange destination, to the terminal 40. When receiving such signal, the processing device 43 of the terminal 40 may delete the data stored to the storage device 44.

When the fifth step S05 is terminated, the second operation is also terminated and the sequence diagram in FIG. 4 is also terminated.

An attention has been paid to operations of inheriting the identification information of the failed or damaged display apparatus 30B to another display apparatus 30C via the terminal 40 by NFC in the above description. Here, an attention should be paid in that, even if the display apparatus 30B is failed or damaged so that operations as a display apparatus 30 cannot be realized, the identification information and/or other data of the display apparatus 30B can be read out if only at least the incorporated NFC device 39 can operate by contactless power supply and a Near Field Communication with the terminal 40 is possible. In addition, an attention should be paid in that the reading out and the writing of the identification information and/or other data can easily and instantaneously performed by NFC technology. As a result of adopting a configuration of the display apparatus 30 according to the present embodiment to perform Near Field Communication, the reading of the identification information by use of a handy size terminal 40 has become possible and consequently, maintenance such as exchanging in failure cases, which was complicated for display apparatuses according to conventional technology, has become easy. In addition, when introducing display apparatuses 30 incorporating NFC devices 39 and terminals 40, conventional host controller 10 and conventional network 20 can be diverted as they are.

In addition, in terms of side effects according to the present embodiment, any kind of information other than the identification information can be included in the data to be inherited between display apparatuses 30. For example, information related to usage status, life analysis or the like of the display apparatus 30 may be included in the inheritance data. Alternatively, information related to each type of items associated to the display apparatuses 30 may be included in the inheritance data.

Information related to usage state, life analysis or the like of a display device 30 will be described. For example, date and time when a usage of the display device 30 started, date and time of exchange to another display apparatus 30, a number of times of accepting an operation by an operator by the input device 36, or the like may be recorded, stored as data of the storage device 394 and inherited to a display apparatus 30 as an exchange destination. These pieces of information can be read out via the terminal 40 even if the display apparatus 30 is failed or damaged; therefore, analysis, examination or the like of cause and countermeasure thereof can be facilitated.

Information related to each type of items associated to the display apparatuses 30 will be described. For example, item number, date of manufacture, manufacturing lot number, a total of number of which operations of picking or the like have been instructed by the host controller 10, or the like may be recorded, stored as data of the storage device 394 and inherited to a display apparatus 30 as an exchange destination. These pieces of information can facilitate management of number of items in an inventory or the like. In addition, these pieces of information can facilitate a securing of traceability at a time of production related to a final product manufactured by assembling items.

Second Embodiment (Use of User's Terminal)

In the first embodiment, it was described that data to be inherited between display apparatuses 30 includes identification information of the display apparatuses 30 and also information related to usage state of the display apparatuses 30, information related to each type of items associated to the display apparatuses 30, or the like. In the present embodiment, it will be described that user data of operators operating by use of the operation assist system 1 furthermore can be stored to a display apparatus 30 and inherited to another display apparatus 30.

An example of configuration of an operation assist system 1 according to the present embodiment will be described.

The operation assist system 1 according to the present embodiment is provided with a host controller 10, a network 20, display apparatuses 30A, 30B and a user terminal. In other words, the operation assist system 1 according to the present embodiment is equal to the operation assist system 1 in FIG. 1 from which the terminal 40 is omitted and to which the user terminal is added. However, in the present embodiment also, similarly to the case of the first embodiment shown in FIG. 1, there is no limit in a total number of the display apparatus 30 and the terminal 40 can also be used in the present embodiment. In other words, the operation assist system 1 according to the present embodiment is equal to the operation assist system 1 according to the first embodiment to which the user terminal is added.

An example of configuration of the user terminal according to the present embodiment will be described.

The user terminal according to the present embodiment is configured similarly to the terminal 40 according to the first embodiment shown in FIG. 3. That is, the user terminal according to the present embodiment is provided with a bus, an interface, a processing device, a storage device, an output device, an input device, a Near Field Communication antenna and a contactless power supply unit.

It is favorable that an operator is equipped with the user terminal so that the Near Field Communication antenna of the user terminal naturally approaches the Near Field Communication antenna 37 of a display apparatus 30 when the operator operates an input device 36 of the display apparatus 30. As an example, the Near Field Communication antenna of the user terminal may have a shape of a ring that an operator equips on a finger. In addition, in this example, components other than the Near Field Communication antenna of the user terminal may be included in another enclosure connected by wire to the ring-shaped Near Field Communication antenna able to be placed in a pocket of the operator's clothes or lowered to the operator's belt.

The storage device of the user terminal stores identification information to identify the operator who uses the user terminal. When an operator operates an input device 36 of a display apparatus 30, Near Field Communication is performed between the user terminal and the display apparatus 30, the display apparatus 30 reads out the identification information of the user terminal and stores to the storage device 34.

By doing so, it is possible to record when and which operator has operated which display apparatus 30, on the display apparatuses 30. In addition, this record can be inherited to another display apparatus 30 together with identification information of the display apparatus 30. Such record may be combined with video recording of a security camera that captures overall situation of the operation assist system 1 to facilitate identification of a corresponding operator when an unlike fraud occurs and to suppress occurrence of fraud, for example.

Although the invention made by the inventor has been specifically described in the above based on the embodiments, it is not necessary to precise that the present invention is not limited to the above-described embodiments, and various modifications can be made without departing from the scope of the invention. In addition, each feature described in the above-described embodiments can be freely combined within a technically consistent scope.

DESCRIPTION OF SYMBOLS

1 Operation assist system
10 Host controller
20 Network
30, 30A, 30B, 30C Display apparatus
31 Bus
32 Connection interface
33 Processing device
34 Storage device
35 Output device
36 Input device
37 Near Field Communication Antenna
38 Contactless power receiving unit
39 NFC device
391 Bus
392 Interface
393 Processing device
394 Storage device
40 Terminal
41 Bus
42 Interface
43 Processing device
44 Storage device
45 Output device
46 Input device
47 Near Field Communication Antenna
48 Contactless power supply unit

The invention claimed is:

1. An operation assist system configured to visually indicate a given operation target selected among a plurality of targets, comprising:
   a display apparatus configured to perform a communication with an external host controller via a given network; and
   a terminal configured to perform a near field communication with the display apparatus,
   wherein the display apparatus comprises:
   a connection interface configured to be connected to the network;
   a first storage device configured to store data to be used for communication with the host controller; and
   a first antenna configured to perform the near field communication with the terminal,
   wherein the terminal comprises:
   a second antenna configured to perform the near field communication with the display apparatus;
   a processing device configured to request, in a first operation state, the display apparatus to transmit the data by the near field communication; and
   a second storage device configured to store the data received from the display apparatus,
   wherein the terminal transmits, in a second operation state different from the first operation state, the data to another display apparatus that will replace the display apparatus by the near field communication.

2. An operation assist method for visually indicating a given operation target selected among a plurality of targets, the method including:

performing, by a display apparatus, a communication with an external host computer via a given network by use of data stored in a first storage device;
performing, by a terminal, a near field communication with the display apparatus,
wherein performing the near field communication includes:
a first operation; and
a second operation,
wherein the first operation includes:
requesting, by the terminal, the display apparatus to transmit the data;
transmitting, by the display apparatus, the data to the terminal in response to the requesting;
receiving, by the terminal, the data;
storing, by the terminal, the received data in a second storage device,
wherein the second operation includes:
transmitting, by the terminal, the data to another display apparatus that will replace the display apparatus; and
receiving, by the another display apparatus that will replace the display apparatus, the data.

* * * * *